US006484518B1

(12) United States Patent
Laugt

(10) Patent No.: US 6,484,518 B1
(45) Date of Patent: Nov. 26, 2002

(54) METHOD AND SYSTEM FOR FEEDING A COOL AIR INLET OF THE CABIN OF AN AIRCRAFT PROPELLED BY AT LEAST ONE JET ENGINE

(75) Inventor: Paul Laugt, Martignas (FR)

(73) Assignee: Dassault Aviation, Paris (FR)

( * ) Notice: Subject to any disclaimer, the term of this patent is extended or adjusted under 35 U.S.C. 154(b) by 0 days.

(21) Appl. No.: 09/705,744

(22) Filed: Nov. 6, 2000

(30) Foreign Application Priority Data

Nov. 10, 1999 (FR) .............................. 99 14147

(51) Int. Cl.⁷ ................................................ F25B 9/00
(52) U.S. Cl. ........................................................... 62/87
(58) Field of Search ............................... 62/88, 87, 402

(56) References Cited

U.S. PATENT DOCUMENTS 4,419,926 A    12/1983  Cronin et al.
5,461,882 A  * 10/1995  Zywiak ........................ 62/401
5,482,229 A     1/1996  Asshauer
5,701,755 A  * 12/1997  Severson et al. .............. 62/402
5,911,388 A  *  6/1999  Severson et al. .......... 244/118.5
5,967,461 A  * 10/1999  Farrington ................ 244/118.5

* cited by examiner

Primary Examiner—William Doerrler
Assistant Examiner—Malik N. Drake
(74) Attorney, Agent, or Firm—Jacobson Holman PLLC

(57) ABSTRACT

In accordance with this method, air bled from the engine is compressed in a turbocompressor (4) and the air compressed in this way is cooled in an exchanger (3) through which is passed air outside the aircraft, a turbine (5) of the turbocompressor (4) is fed with the air cooled in this way, and the cool air inlet (10) of the cabin is fed with the air leaving the turbine (5). In accordance with the invention, mechanical energy is extracted from the air leaving the cabin (11) of the aircraft and that mechanical energy is injected into the turbocompressor (4). Cooling energy is also extracted from the air leaving the cabin (11) and that cooling energy is injected into the air which is fed to the turbine (5).

4 Claims, 1 Drawing Sheet

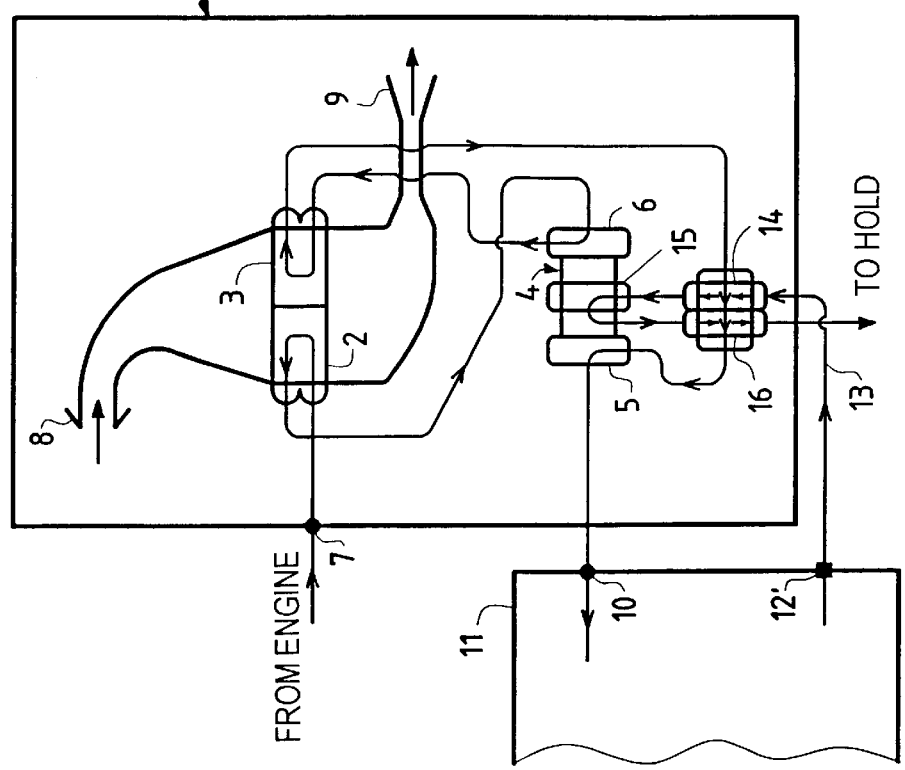
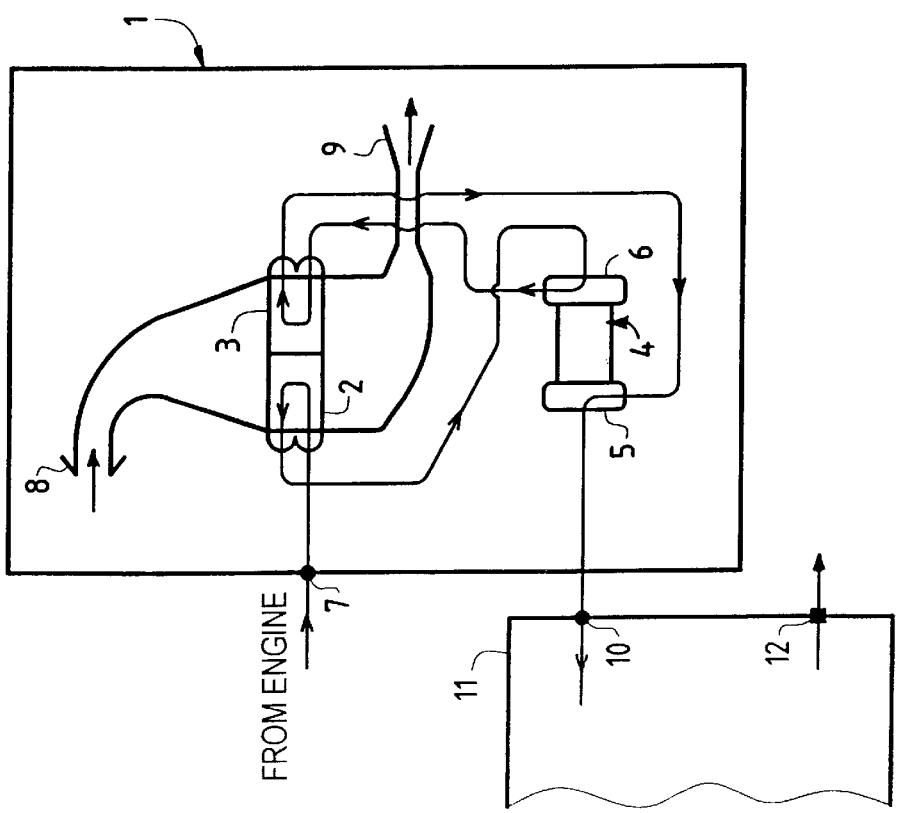

METHOD AND SYSTEM FOR FEEDING A COOL AIR INLET OF THE CABIN OF AN AIRCRAFT PROPELLED BY AT LEAST ONE JET ENGINE

FIELD OF THE INVENTION

The present invention relates to a method of feeding a cool air inlet of the cabin of an aircraft propelled by at least one jet engine and more particularly to a method in which air bled from the engine is compressed in a turbocompressor, the air compressed in this way is cooled in a heat exchanger through which air outside the aircraft is passed, the air cooled in this way is fed to a turbine stage of the turbocompressor, and the cool air inlet is fed with air leaving the turbine stage.

BACKGROUND OF THE INVENTION

FIG. 1 of the accompany drawings is a diagram showing a system for feeding the cabin of an aircraft with cool air. The system is of a type known in the art. As shown here, the system 1 essentially comprises a heat pre-exchanger 2, a heat exchanger 3 and a turbocompressor 4 comprising a turbine stage 5 and a compressor 6.

The pre-exchanger 2 is connected to an inlet 7 for air bled from a compression stage of a jet engine propelling the aircraft when the latter is flying at cruising speed. This air is routinely at a temperature of several hundred degrees and is cooled in the pre-exchanger 2 by a stream of air which is taken from outside the aircraft via an air intake 8 feeding a chamber of the exchanger and evacuated via an outlet 9 of that chamber.

The air bled from the engine leaving the pre-exchanger 2 is sufficiently cooled to enter the compressor 6, which is routinely made of light alloy. The compressed, and therefore heated, air which leaves the compressor 6 is cooled again in the exchanger 3, by the same flow of outside air between the intake 8 and the outlet 9, so that its temperature is substantially reduced to that of the flow of outside air.

The air leaving the exchanger 3 then enters the turbine stage 5 which drives the compressor 6. As the air expands in the turbine stage its temperature falls to a relatively low value, of the order of 3° C., for example, suitable for feeding it to the cool air inlet 10 of the cabin 11 of the aircraft (part of which is shown diagrammatically in FIG. 1) with no risk of the pipes through which it flows icing up.

The cool air at 3° C. delivered to the cabin is mixed with the air in the cabin to cool it. The cabin air pressure is regulated by one or more valves 12 which are part of a system for pressurizing the cabin 11 and allow some of the air in the cabin to escape from it.

Part of the fuel consumption of the jet engine from which the air is bled to feed the system described above is obviously associated with bleeding the air in this way. The difference ΔT between the temperature of the air entering the cabin (approximately 3° C.) and the temperature of the air in the cabin (approximately 20° C.) is relatively small (approximately 17°) and makes it necessary to choose the dimensions of the system so that it can supply a relatively high flow of cooled air to the cabin, which adds to the overall size, weight and consequently manufacturing cost of the system.

An object of the present invention is to provide a method of feeding a cool air inlet of the cabin of an aircraft adapted to be used with a system for reducing the fuel consumption of the engine from which the system bleeds compressed air, the system also being lighter, more compact and less costly to manufacture than the prior art system described in the preamble of this description.

SUMMARY OF THE INVENTION

The above object of the present invention is achieved with a method of feeding a cool air inlet of the cabin of an aircraft propelled by at least one jet engine, of the type described in the preamble of this description, and in which mechanical energy is extracted from the air leaving said cabin of the aircraft, said mechanical energy is injected into said turbocompressor by means of a second turbine stage coupled to the first turbine stage, and cooling energy is additionally extracted from said air leaving the cabin of the aircraft, which method is noteworthy in that the cooling energy extracted in this way is injected into the cooled air leaving the exchanger downstream of the compressor with the aid of a second heat exchanger and a third heat exchanger located respectively upstream and downstream of said second turbine stage.

As described in detail later, the above method delivers to the cabin air which is at a lower temperature, and which can therefore have a lower flowrate, than that delivered by the FIG. 1 system, which is beneficial in terms of the fuel consumption of the jet engine from which the air is bled and from the point of view of the weight, overall size and therefore cost of manufacture of the system for implementing the method according to the invention.

That system, which includes an inlet for air bled from the engine, a turbocompressor including a turbine stage and a compressor fed with the air bled from the engine, an exchanger fed with the air leaving said compressor to cool said air with the air of a flow of air outside the aircraft, the cooled air outlet of the exchanger feeding said turbine stage, a second turbine stage coupled to the first turbine stage and fed with air extracted from the cabin of the aircraft, means fed with the air extracted from the cabin for cooling the air bled from the engine and leaving the exchanger, being noteworthy in that said means include a) a second heat exchanger for heating the air coming from the cabin and delivered to the second turbine stage and for cooling the air bled from the engine and leaving the first heat exchanger and b) a third heat exchanger for heating the air leaving the second turbine stage and for cooling the air bled from the engine.

Other features and advantages of the present invention will become apparent on reading the following description and examining the accompanying drawings.

BRIEF DESCRIPTION OF THE DRAWINGS

FIG. 1 is a diagram of a system for feeding with cool air the cabin of an aircraft propelled by a jet engine, which system is known in the art and described in the preamble of this description, and FIG. 2 is a diagram of a system of the same type modified to implement the method according to the present invention.

In FIG. 2 of the accompanying drawing, reference numbers identical to those used in FIG. 1 designate identical or similar units or devices. Accordingly, the system 1' in accordance with the invention includes the units or devices 2 to 11 from FIG. 1.

The system 1' according to the invention therefore differs from the FIG. 1 system essentially in that it includes means for extracting mechanical energy and/or cooling energy from the air leaving the cabin through a cabin pressurization valve 12'.

DETAILED DESCRIPTION OF THE PREFERRED EMBODIMENT

In this connection, note that in the prior art system described hereinabove with reference to FIG. 1, the air leaving the cabin via the valve 12 looses all of its energy outside the cabin, without that energy being used in any way.

In contrast, in accordance with the invention, at least a significant portion of that energy is recovered to operate the system 1'. To this end, the air leaving the cabin via the valve 12' is conducted via a tube 13 into a second heat exchanger 14 in which it exchanges heat with the air leaving the exchanger 3 and then enters a second turbine stage 15 of the turbocompressor 4, coupled to the first turbine stage 5, in which it expands before passing through a third exchanger 16 where it again exchanges heat with the air that has passed through the pre-exchanger 2 and the exchangers 3 and 14, in that order. The air finally escapes to the exterior or into another compartment of the aircraft which also requires some degree of air conditioning, such as a hold.

Accordingly, the air leaving the exchanger 3, which is at a temperature close to that of the air entering the intake 8, is cooled in the exchanger 14 by air which has come from the cabin, at a temperature of 20° C., for example, which is heated before it enters the turbine stage 15. This heating has the advantage of raising the mechanical power delivered by the turbine stage 15 to the compressor 6 of the turbocompressor 4 for the same air expansion ratio in the turbine stage 15.

As the air coming from the cabin 11 expands in the turbine stage 15 it is cooled. The air cooled in this way feeds the third exchanger 16, in which it further cools the air bled from the engine, which has just been cooled in the second exchanger 14. On leaving the exchanger 16, the air bled from the engine enters the turbine stage 5, in which it expands and delivers mechanical energy to the compressor 6, which energy is added to that delivered by the turbine stage 15. As it expands, the air bled from the engine is cooled further and finally feeds the cool air inlet 10 of the cabin 11.

The air coming from the cabin which finally passes through the exchanger 16 is heated therein to provide the air conditioning of the hold referred to above, for example. It can instead simply be evacuated to the exterior.

It is now apparent that the air coming from the cabin delivers mechanical energy to the turbocompressor 4 and cooling energy (negative calories) to the air to be fed to the cool air inlet of the cabin. The energy recovered in this way from the air leaving the cabin, which was previously dissipated to no benefit in the space around the aircraft, reduces the energy taken from the jet engine of the aircraft, which is beneficial in terms of the fuel consumption of the aircraft, and accords with one of the objects of the present invention.

By way of non-limiting and illustrative example only, in the case of flight at maximum supersonic speed, at maximum altitude, on a hot day, with an air intake 8 for the exchangers 2 and 3 in the boundary layer traps of the engine delivering air at approximately 109° C., the temperature and the pressure of the air delivered by the engine, between the engine outlet and the cabin inlet 10, evolves in the manner shown by the following table:

|  | Pressure mb | T ° C. |
|---|---|---|
| Engine outlet | 2400 | 435 |
| Pre-exchange 2 outlet | 1990 | 129 |
| Compressor 6 outlet | 5641 | 310 |
| Exchanger 3 outlet | 5521 | 119 |
| Exchanger 14 outlet | 5451 | 45 |
| Exchanger 16 outlet | 5401 | 19 |
| Cabin inlet 10 | 753 | −79 |

The table shows that the system according to the invention is capable of supplying air at approximately −79° C. to the cabin, whereas the prior art system described with reference to FIG. 1 can cool the air to only approximately 3° C.

The temperature difference between the cooling air at −79° C. and the air in the cabin at 20° C. is approximately 100°, whereas the corresponding temperature difference with the FIG. 1 system is approximately 20°−3°=17°. The capacity for cooling the cabin air is therefore approximately six times greater than in the FIG. 1 system. It follows that the flowrate of the cooling air can be greatly reduced, in substantially the same ratio, which reduces the overall size, weight and manufacturing cost of the system according to the invention and the additional fuel consumption associated with having the compressor of the engine supply air to the system, as previously indicated.

Note that the disposition of the exchangers 14 and 16 prevents them being iced up by water vapor breathed out by the passengers in the cabin (see the above table), which increases the overall efficiency of the cooling means used.

It is clear that the system in accordance with the invention requires modification of the setting of the valves 12' which are part of the cabin pressurization system. Previously, the head loss in the valves could without disadvantage be as high as approximately 700 mb, which is the difference between the cabin pressure and the outside pressure.

According to the invention, the setting must be reduced to a minimum, for example approximately 50 mb, so that the air leaving the cabin has the highest possible pressure and the system according to the invention can extract the maximum mechanical energy from it. Cabin pressure regulation over a range of only 50 mb also improves the accuracy of that pressure.

Of course, the invention is not limited to the embodiment described and shown by way of example only. Thus it would not depart from the scope of the invention to extract only mechanical energy or only cooling energy from the air leaving the cabin, for the benefit of the system according to the invention. Although the invention is described above in the environment of an aircraft flying at supersonic cruising speed, the invention is equally applicable to any aircraft, in particular and by way of example only to large subsonic carriers designed to carry several hundred passengers whose cumulative heat radiation is high, requiring a high-capacity cabin air cooling system.

What is claimed is:

1. A method of feeding a cool air inlet of a cabin of an aircraft propelled by at least one jet engine, in which method air bled from said engine is compressed in a turbocompressor, the air compressed in this way is cooled in a heat exchanger through which air outside the aircraft passes, a turbine stage of said turbocompressor is fed with the air cooled in this way, said cool air inlet is fed with the air leaving said turbine stage, mechanical energy is extracted from the air leaving said cabin of the aircraft, said mechanical energy is injected into said turbocompressor by means of a second turbine stage coupled to the first turbine stage, and cooling energy is additionally extracted from said air leaving the cabin, said cooling energy being injected into said cooled air leaving said exchanger with the aid of a second heat exchanger and a third heat exchanger located respectively upstream and downstream of said second turbine stage.

2. A system for implementing the method according to claim 1, including an inlet for air bled from the engine, a turbocompressor including a turbine stage and a compressor fed with the air bled from the engine, an exchanger fed with the air leaving said compressor to cool said air with the air of a flow of air outside the aircraft, the cooled air outlet of the exchanger feeding said turbine stage, a second turbine stage coupled to the first turbine stage and fed with air extracted from the cabin, means fed with said air extracted from the cabin for cooling the air bled from the engine and leaving said exchanger, said means including a) a second heat exchanger for heating the air coming from the cabin and delivered to said second turbine stage and for cooling the air bled from the engine and leaving said heat exchanger, and b) a third heat exchanger for heating the air leaving said second turbine stage and for cooling the air bled from the engine.

3. A system according to claim 2, further comprising a heat pre-exchanger connected directly to the inlet for air bled from the engine to cool that air with a flow of air outside the aircraft.

4. A system according to claim 2 wherein the air from the cabin which feeds said system leaves said cabin via a valve forming part of the system for pressurizing the cabin.

* * * * *